United States Patent
Manes et al.

(10) Patent No.: US 9,821,958 B2
(45) Date of Patent: Nov. 21, 2017

(54) SYSTEM FOR SIMULTANEOUS PIVOTING AND TRANSLATION OF ROBOT ARM OF STORAGE LIBRARY

(71) Applicant: ORACLE INTERNATIONAL CORPORATION, Redwood City, CA (US)

(72) Inventors: Joseph Paul Manes, Arvada, CO (US); Daniel James Plutt, Superior, CO (US); Timothy Craig Ostwald, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 283 days.

(21) Appl. No.: 14/578,643

(22) Filed: Dec. 22, 2014

(65) Prior Publication Data
US 2016/0176632 A1    Jun. 23, 2016

(51) Int. Cl.
*B65G 1/04* (2006.01)
*B25J 9/10* (2006.01)
*G11B 15/68* (2006.01)
*G11B 17/22* (2006.01)

(52) U.S. Cl.
CPC ............ *B65G 1/0428* (2013.01); *B25J 9/109* (2013.01); *G11B 15/6835* (2013.01); *G11B 17/225* (2013.01)

(58) Field of Classification Search
CPC ...... B65G 1/0407; B65G 1/0428; B65G 1/06; G11B 15/6835; G11B 17/225; B66F 9/07; B66F 9/072; B25J 9/109; B25J 9/107; B25J 9/162; H01L 21/67742; H01L 21/67748

USPC ............ 414/222.12, 222.13, 223.01, 223.02, 414/226.05
See application file for complete search history.

(56) References Cited

U.S. PATENT DOCUMENTS

| | | | |
|---|---|---|---|
| 5,013,210 A * | 5/1991 | Bond | B21D 43/105 414/225.01 |
| 5,128,912 A * | 7/1992 | Hug | G11B 17/225 360/99.02 |
| 5,426,581 A * | 6/1995 | Kishi | B25J 9/1692 235/383 |
| 6,038,490 A * | 3/2000 | Dimitri | G11B 15/6835 360/98.04 |
| 6,064,544 A | 5/2000 | Wada | |
| 6,393,335 B1 | 5/2002 | Ostwald | |
| 6,532,402 B2 | 3/2003 | Ostwald et al. | |

(Continued)

*Primary Examiner* — Glenn Myers
(74) *Attorney, Agent, or Firm* — Marsh Fischmann & Breyfogle LLP; Jonathon A. Szumny

(57) ABSTRACT

Utilities (e.g., systems, apparatuses, methods) that reduce robotic assembly contention in media element storage libraries by translating (e.g., displacing) a robot arm of a first robotic assembly mounted over a first storage array of a storage library away from a central reference plane as the robot arm is being pivoted into a first position adjacent the first storage array to allow a robot arm of a second robotic assembly to slide or otherwise move past the robot arm of the first robotic assembly, even when the robot arms of the first and second robot arms are disposed at the same height (e.g., along a z-axis) within the storage library. For instance, a pivot member of the robot arm may be mounted on a carriage that is configured to translate between the first and second storage arrays in response to the pivot member being pivoted about a pivot axis.

18 Claims, 14 Drawing Sheets

(56) References Cited

U.S. PATENT DOCUMENTS

| | | | |
|---|---|---|---|
| 6,922,307 B2 | 7/2005 | Ostwald et al. | |
| 7,231,278 B2* | 6/2007 | Ngo | G11B 15/6835 700/213 |
| 8,176,505 B2 | 5/2012 | Grow | |
| 8,290,612 B2* | 10/2012 | Jesionowski | G11B 15/682 360/92.1 |
| 9,001,457 B1 | 4/2015 | Ostwald | |
| 2003/0123184 A1* | 7/2003 | Ostwald | G11B 17/225 360/92.1 |
| 2003/0155460 A1* | 8/2003 | Hiraguchi | G11B 23/107 242/337 |
| 2004/0165489 A1* | 8/2004 | Goodman | G11B 15/6825 360/92.1 |
| 2004/0202062 A1 | 10/2004 | Ostwald | |
| 2006/0099382 A1* | 5/2006 | Hori | G11B 15/6835 428/138 |
| 2008/0186614 A1* | 8/2008 | Kotaki | G11B 17/225 360/69 |
| 2013/0083642 A1* | 4/2013 | Hori | G11B 17/225 369/75.11 |

* cited by examiner

SYSTEM FOR SIMULTANEOUS PIVOTING AND TRANSLATION OF ROBOT ARM OF STORAGE LIBRARY

BACKGROUND

1. Field of the Invention

The present invention relates generally to storage libraries for storing a plurality of media elements such as tape cartridges and, more particularly, to robotic assemblies that are configured to manipulate media elements within a storage library.

2. Relevant Background

Storage library systems are often used by enterprises and the like to efficiently store and retrieve data from storage media. In the case of some storage libraries, the media may be data or media elements (e.g., tape cartridges) that are typically stored and indexed within a set of magazines. When particular data is requested, for instance, a specialized robotic assembly or mechanism (e.g., robotic module) finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

To operate properly, each robotic mechanism is expected to reliably (e.g., repeatedly and accurately) and rapidly find, retrieve, and deliver desired media elements (e.g., per instructions from one or more host computers) throughout the storage library cartridge inventory. Generally, a robotic mechanism includes a hand assembly (e.g., picker) that is operable to reliably grip a desired cartridge and remove it from a magazine or drive, or to reliably grip a cartridge and release the cartridge into a desired magazine slot or drive. The robotic mechanism is often configured to translate or displace an arm on or in which the hand assembly is mounted along the z axis (e.g., in the vertical dimension along a column of media elements) and along an x or y axis (e.g., in a horizontal dimension along a row of media elements), such as through any appropriate arrangement of gears, tracks, belts, cables, hydraulics, and/or other such control mechanisms. Some robotic mechanisms are configured to pivot or rotate the arm and/or hand assembly about one or more of the x, y, or z axes (e.g., roll, pitch and yaw, respectively).

As automated storage libraries have become larger and more complex, their designs have evolved from a single wall or array of storage slots to multiple walls of storage slots in various shapes and configurations. For instance, one type of storage library includes first and second spaced storage arrays separated by an aisle and whose storage or magazine slots generally face each other. A robotic assembly (e.g., robotics module) mounted over one of the storage arrays is configured to manipulate media elements on the storage array, such as by grabbing and removing a media element and mounting the media element in another storage slot or media drive or by grabbing and inserting a media element into a particular storage slot of the array. In one arrangement, a robotic assembly may be configured to manipulate media elements of either of the first or second spaced storage arrays, such as by pivoting or rotating its robot arm through 180° or the like to access the first or second storage arrays as appropriate. In an attempt to increase throughput, two or more robotic assemblies may be mounted on the same rail assembly over one of the storage arrays, where the robot arms of each of the robotic assemblies can access media elements of both of the first and second storage arrays, such as by pivoting or rotating its robot arm through 180° or the like to access the first or second storage arrays as appropriate.

SUMMARY

One problem that arises when two or more robotic assemblies are mounted on the same rail assembly over the same storage array is contention between the first and second robotic assemblies when trying to simultaneously complete different respective jobs. In the case where a first robotic assembly moves to the middle of the first or second storage arrays (e.g., to retrieve a media element, to access a media player, etc.), for instance, a second robotic assembly would have to wait to access the middle of the first or second storage array or any location on the other end of the first or second storage array due to the inability of first and second robotic assemblies on the same rail assembly to be able to pass each other. Even if such first and second robotic assemblies were respectively mounted over the first and second storage arrays on different respective rail assemblies, contention would still result because the pivot axes of the robot arms are typically disposed halfway between the first and second storage arrays to allow the robot arms to access either of the first or second storage arrays by pivoting through 180°. More specifically, attempting to move the first robotic assembly past the second robotic assembly (or vice versa) would result in contact or interference between the first and second robotic assemblies as both of their robot arm pivot axes are disposed halfway between the first and second storage arrays (e.g., when the robot arms of the first and second robotic assemblies are disposed at the same height or position along the z-axis). In this situation, a system controller or the like would receive signal regarding the potential contact or contention and accordingly inhibit movement of first robotic assembly to complete its job until the second robotic assembly has been moved out of the path of the first robotic assembly resulting in media element access delays and other inefficiencies.

In view of the foregoing, disclosed herein is a system allows a robot arm of a robotic assembly to pivot or rotate about a pivot axis between a first rotational position adjacent a first storage array of a storage library and a second rotational position adjacent a spaced second storage array of the storage library (e.g., through 180 degrees or the like) while simultaneously translating or displacing the pivot axis (and thus the entire robot arm) between a first translational position adjacent the first storage array and a second translational position disposed towards the second storage array to eliminate or reduce robotic assembly contention and other related inefficiencies in a media element storage library.

As used herein, the x-axis is defined to be an axis that is horizontal and parallel to the front faces of the first and second storage arrays (e.g., parallel to the openings of the storage slots of the first and second storage arrays), the y-axis is defined to be an axis that is horizontal and perpendicular to the front faces of the first and second storage arrays (e.g., perpendicular to the openings of the storage slots of the first and second storage arrays), and the z-axis is defined to be an axis that is vertical and parallel to the front faces of the first and second storage arrays (e.g., parallel to the openings of the storage slots of the first and second storage arrays).

More specifically, the robot arm of the disclosed robotic assembly includes any appropriate pivot apparatus or member (e.g., pivot pin or the like) that facilitates pivoting or rotation of the robot arm about the pivot axis (e.g., about the z-axis or the x-axis) between the first and second positions. The pivot member is mounted on a movable carriage that is configured to slide or otherwise translate (e.g., along the y-axis or x and y-axes) between the first and second translation positions relative to a mounting apparatus of the robotic assembly in response to the pivot member of the robot arm being pivoted about the pivot axis (via a cam assembly interconnected between the pivot member, the carriage and the mounting apparatus).

When the robot arm of a first robotic assembly that is mounted over the first storage array is thus pivoted into its first rotational position adjacent the first storage array, its moveable carriage and pivot axis are thus positioned at a first translational position. In the first translational position, a first free end of the robot arm (on a first side of the pivot axis) is adjacent the first storage array (e.g., to allow a picker to emerge from the first free end to manipulate media elements of the first storage array) and a second free end of the robot arm (on an opposite second side of the pivot axis separated by about 180° from the first free end) is spaced from the first storage array but positioned between the first storage array and a reference plane (e.g., a central reference plane) positioned halfway between the first and second storage arrays along the z-axis. Similarly, when the robot arm of a second robotic assembly mounted over the second storage array is pivoted into its first rotational position adjacent the second storage array, its moveable carriage and pivot axis are thus positioned at a first translational position so that the first free end of its robot arm is adjacent the second storage array (e.g., to allow a picker to emerge from the first free end to manipulate media elements of the second storage array) and the second free end of its robot arm is positioned between the second storage array and the reference plane.

In this regard, the robot arm and pivot axis of the first robotic assembly are thus fully contained or disposed between the first storage array and the reference plane (but do not overlap or intersect the reference plane) when in the first rotational and translational positions and the robot arm and pivot axis of the second robotic assembly are thus fully contained or disposed between the second storage array and the reference plane (but do not overlap or intersect the reference plane) when in the first rotational and translational positions. Advantageously, the robot arm of either of the first and second robotic assemblies can move past (e.g., along the x-axis) the robot arm of the other of the first and second robotic assemblies when in their first rotational and translational positions, even when the robot arms are positioned at the same height along the z-axis.

Thereafter, when the robot arms are no longer overlapping along the x-axis (when one of the robot arms has moved past the other of the robot arms), the robot arm of at least one of the first and second robotic assemblies can be pivoted (e.g., via a corresponding motor and system controller) into its second rotational position which simultaneously translates the carriage, robot arm and pivot axis into the second translational position to position the first free end of the robot arm adjacent the other of the first and second storage arrays for manipulation of media elements thereof. For instance, pivoting of the robot arm of the first robotic assembly about its pivot axis into its second rotational position simultaneously translates the pivot axis (and thus the robot arm) into its second translational position towards the second storage array so that the first free end of the robot arm "reaches across" the aisle or interior space between the first and second storage arrays to a position adjacent the second storage array to allow the picker to emerge from the first free end to manipulate media elements of the second storage array. In the second rotational and translational positions, the robot arm and pivot axis of the first robotic assembly are disposed between the second storage array and the reference plane.

In one arrangement, each robotic assembly may have at least one x-axis guide or guiding member or apparatus, such as upper and lower x-axis guide members or apparatuses that are slidable or translatable along an x-axis within respective upper and lower tracks or grooves that are adjacent upper and lower portions of the first and second storage arrays. In another arrangement, the upper and lower guide members of each robotic assembly may be slidable within respective upper and lower tracks or grooves along an x-axis adjacent the ceiling and floor of the storage library. In further arrangements, the robotic assemblies may be translatable along the x-axis in other manners such as through magnetic strips, optical guides, and/or the like. In any case, each robotic assembly may also include any appropriate z-axis guide member or apparatus (e.g., rail assembly) interconnected between the upper and lower x-axis guide members along which the robot arm is configured to translate or slide along the z-axis. For instance, the mounting apparatus of each robotic assembly may be rigidly secured to a sliding member that is configured to slide or translate along a z-axis relative to the x-axis guide members of the robotic assembly.

In one aspect, a robotic assembly for manipulating media elements in a media element storage library is disclosed that includes a mounting apparatus, a carriage member slidably attached to the mounting apparatus for movement relative to the mounting apparatus along a translation axis, a robot arm pivotally attached to the carriage member for rotation about a pivot axis fixed through the carriage member between at least a first rotational position for manipulating media elements of a first storage array of a storage library and a second rotational position for manipulating media elements of a second storage array of the storage library that is spaced from the first storage array, and a cam assembly that induces translation of the carriage member along the translation axis between at least a first translational position in response to rotation of the robot arm about the pivot axis into the first rotational position and a second translational position in response to rotation of the robot arm about the pivot axis into the second rotational position.

In one arrangement, the cam assembly may include a slot within the mounting apparatus, a rotating component rotatably attached to the carriage member for rotation about a rotation axis, and a sliding member attached to the rotating component and slidably received in the slot such that rotation of the robot arm about the pivot axis induces rotation of the rotating component about the rotation axis to slide the sliding member in the slot and thereby simultaneously translate the carriage member along the translation axis. For instance, the cam assembly may be in the form of a scotch yoke or slotted link mechanism.

In one variation, the robotic assembly may further include a pivot member pivotally attached to the carriage member along the pivot axis, where the robot arm is non-movably attached to the pivot member, and where rotation of the pivot member about the pivot axis induces rotation of the rotating component about the rotation axis to slide the sliding member in the slot and thereby simultaneously translate the carriage member along the translation axis. For instance, the pivot member may include a first gear non-movably attached thereto for rotation about the pivot axis, the rotating component may include a second gear rotatable about the rotation axis, and the cam assembly may further include a third gear intermeshed with the first and second gears that induces rotation of the second gear about the rotation axis in a clockwise or counterclockwise direction when the first gear is rotated about the pivot axis in the clockwise or counterclockwise direction.

In another aspect, a method of operating a robotic assembly of a media element storage library is disclosed that includes first rotating a robot arm of a robotic assembly about a pivot axis from a first rotational position adjacent a first storage array of a media element storage library to a second rotational position adjacent a second storage array that is spaced from the first storage array, and first translating the pivot axis towards the second storage array in direct response to and simultaneously with the rotating step. For instance, the first translating may include displacing the pivot axis along a translation axis from a first translational position to a second translational position that is disposed between the first translational position and the second storage array.

In a further aspect, a media element storage library includes a first storage array including a plurality of media element storage slots, a second storage array including a plurality of media element storage slots that are spaced from and face the media element storage slots of the first storage array, a first robotic assembly configured to translate over the first storage array parallel to an x-axis, and a second robotic assembly configured to translate over the second storage array parallel to the x-axis. The first robotic assembly includes a robot arm that is pivotal about a pivot axis between at least a first rotational position for manipulating media elements in the media element storage slots of the first storage array and a second rotational position for manipulating media elements in the media element storage slots of the second storage array, and the second robotic assembly includes a robot arm that is pivotal about a pivot axis between at least a first rotational position for manipulating media elements in the media element storage slots of the second storage array and a second rotational position for manipulating media elements in the media element storage slots of the first storage array. The robot arms of the first and second robotic assemblies are simultaneously positionable in their respective first rotational positions at a common height along a z-axis that is perpendicular to the x-axis.

In one arrangement, pivoting of the robot arm of the first robotic assembly about the pivot axis of the first robotic assembly induces simultaneous translation of the pivot axis of the first robotic assembly along a first course that is parallel to a y-axis, pivoting of the robot arm of the second robotic assembly about the pivot axis of the second robotic assembly induces simultaneous translation of the pivot axis of the second robotic assembly along a second course that is parallel to the y-axis, and the y-axis is perpendicular to each of the x and z-axes.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein are systems and apparatuses that reduce robotic assembly contention for job completions in media element storage libraries by translating (e.g., displacing) a robot arm of a first robotic assembly mounted over a first storage array of a storage library away from a central reference plane as the robot arm is being pivoted into a first position adjacent the first storage array to allow a robot arm of a second robotic assembly to slide or otherwise move past the robot arm of the first robotic assembly, even when the robot arms of the first and second robotic assemblies are disposed at the same height (e.g., along a z-axis) within the storage library. The robot arm of the disclosed robotic assembly includes any appropriate pivot apparatus or member (e.g., pivot pin or the like) that facilitates pivoting or rotation of the robot arm about the pivot axis (e.g., about the z-axis or the x-axis) between the first and second rotational positions. The pivot member is mounted on a movable carriage that is configured to slide or otherwise translate (e.g., along the y-axis or x and y-axes) between first and second translation positions relative to a mounting apparatus or member of the robotic assembly in response to the pivot member of the robot arm being pivoted about the pivot axis (via a cam assembly interconnected between the pivot member, the carriage and the mounting member).

Figure 1:
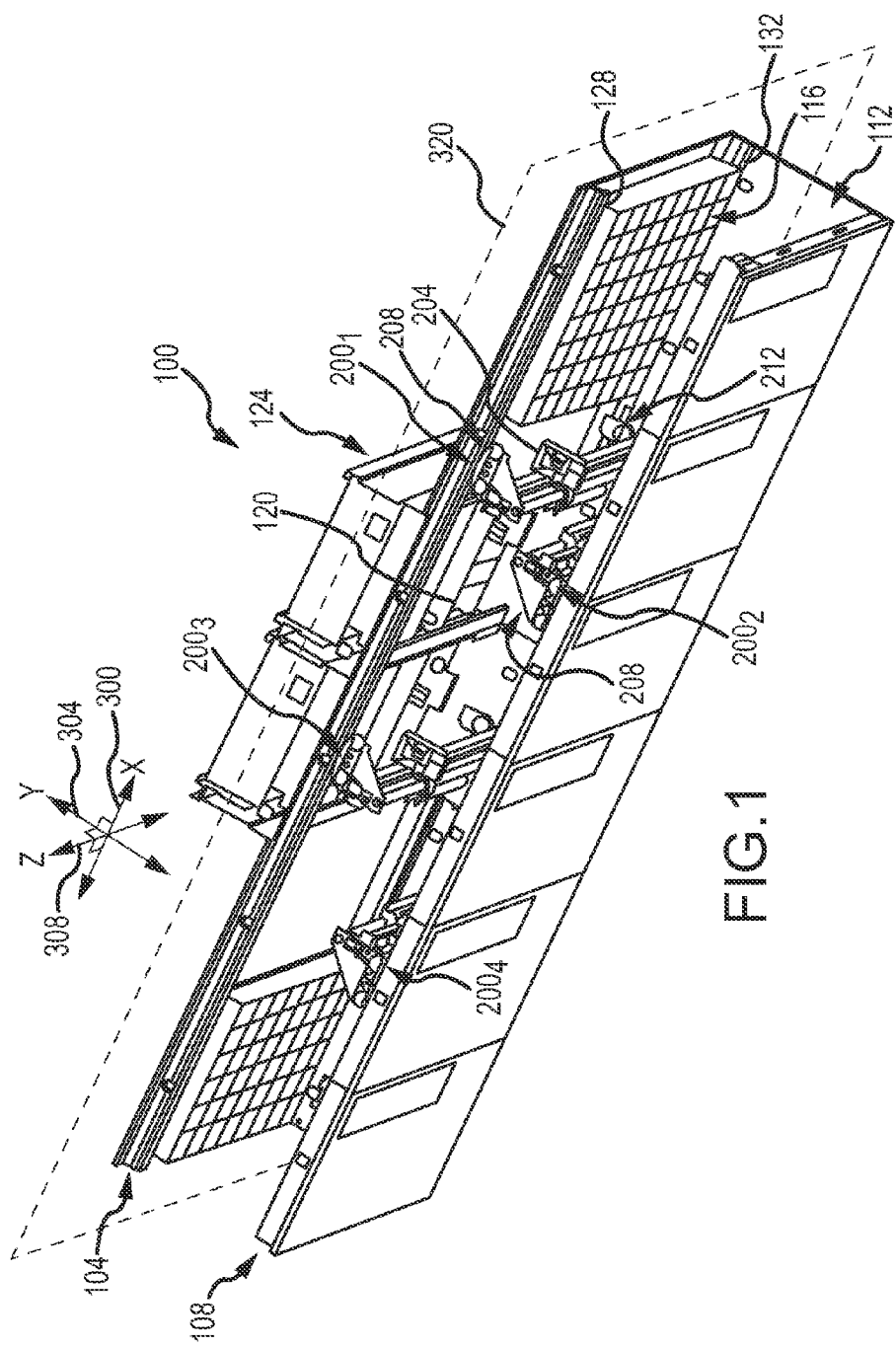
FIG. 1 is a perspective view of a media element storage library within which the robotic assemblies disclosed herein may be utilized.
Figure 2:
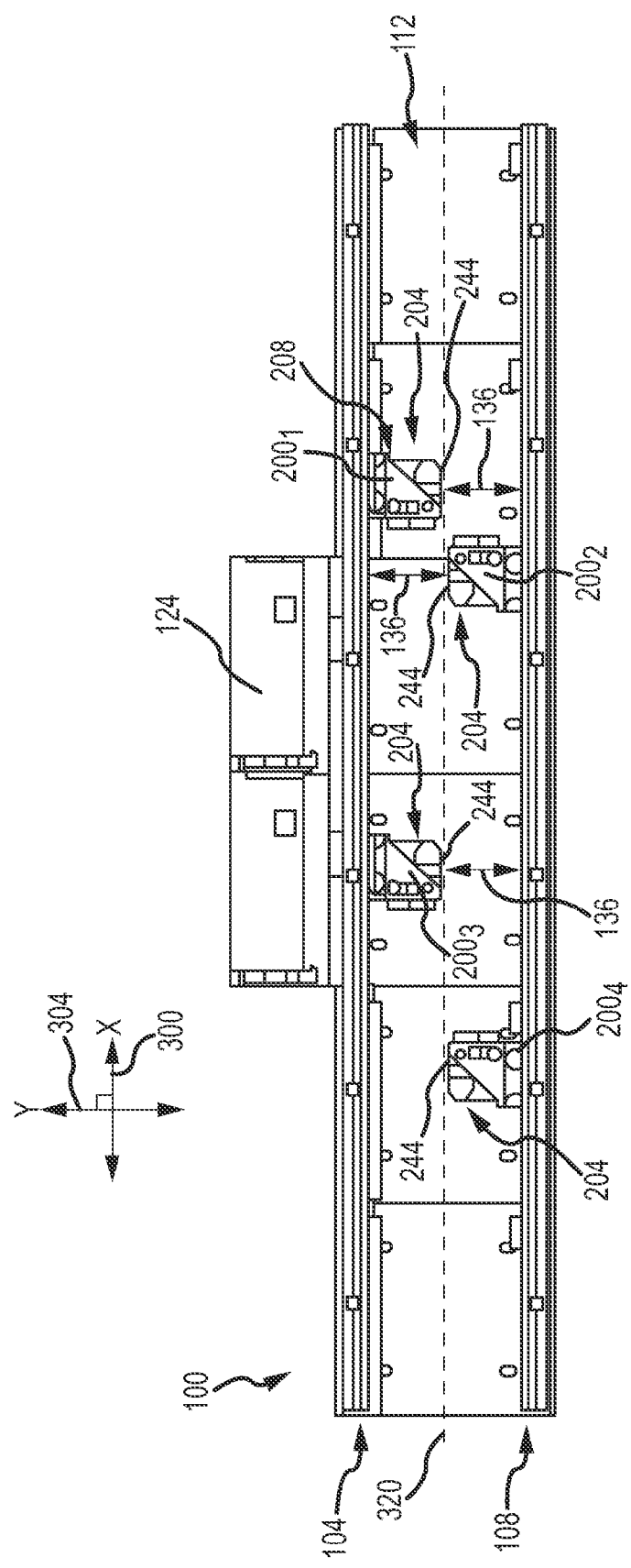
FIG. 2 is a plan view of the media element storage library of FIG. 1.
Figure 3:
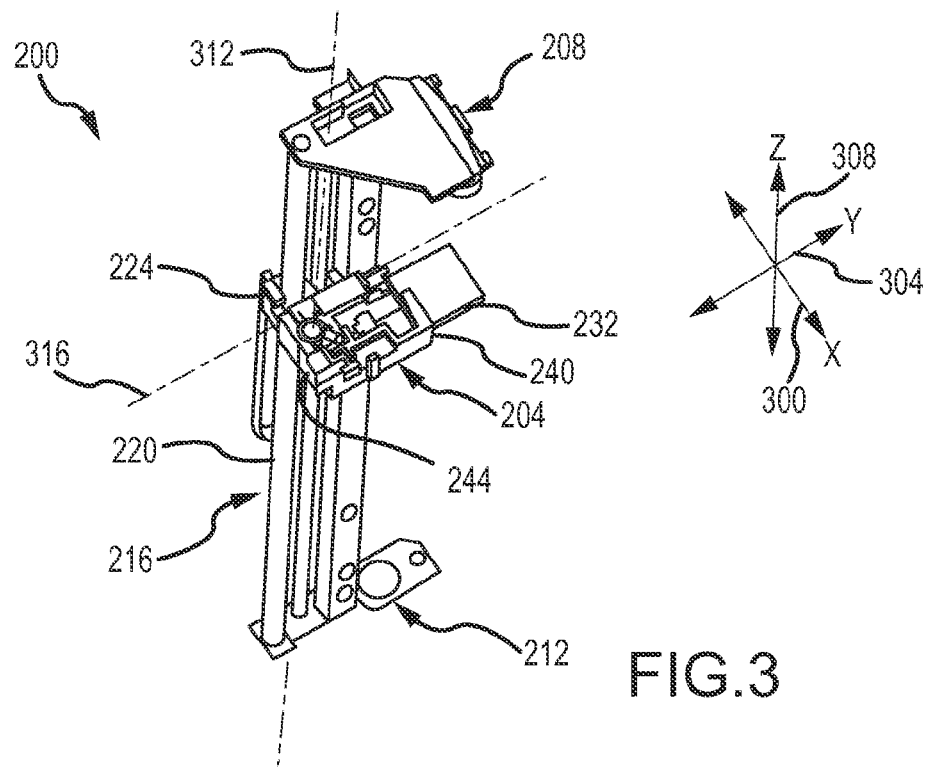
FIG. 3 is a perspective view of a robotic assembly disclosed herein, with a robot arm of the robotic assembly in a first rotational and translational position.
Figure 4:
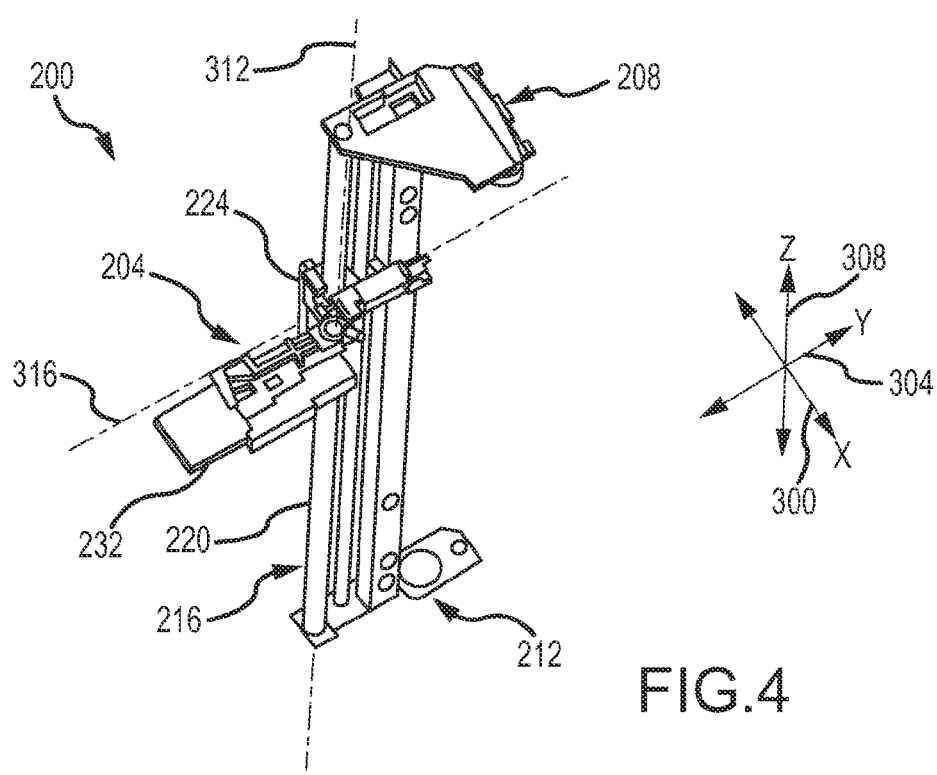
FIG. 4 is a perspective view similar to that in FIG. 3, but with the robot arm of the robotic assembly in a second rotational and translational position.

Before discussing the disclosed systems and apparatuses in more detail, reference is now initially made to FIGS. 1-2 which present views of a media element storage library 100 within which the disclosed robotic assemblies 200 may be incorporated in a manner that reduces contention between the robotic assemblies 200 to complete jobs within the storage library 100. Broadly, the storage library 100 may be a data storage and retrieval system for one or more computers, servers, and/or the like and may be designed for handling and storing a plurality of media elements and for reading and writing to the media elements using media element players. As used herein, a media element denotes any physical substrate suitable for storing data, such as a tape cartridge and/or the like. A media element player may be a media element reader and/or writer (such as a tape drive) that translates the data stored on a media element into signals readable by a computer and/or server for reading operations and/or writes data to the media element in response to a command from the computer and/or server for writing operations. While FIGS. 1-2 illustrate one embodiment of a storage library, it is to be understood that the robotic assemblies 200 disclosed herein may be utilized in numerous other storage libraries and contexts in which it is desired to limit robotic assembly contention for media element job completion.

Generally, the storage library 100 may be constructed of any appropriate upright framework or structure that allows for rapid storage and access of media elements by the robotic assemblies 200 (e.g., first, second, third and fourth robotic assemblies $200_1$, $200_2$, $200_3$, $200_4$) based on commands received from any appropriate interconnected system controller and/or host device (e.g., server, computer, etc.). As an example, the storage library 100 may include a first storage wall or array 104 and an opposite second storage wall or array 108 spaced from the first storage array 104 by an aisle or interior portion 112. Each of the first and second storage arrays 104, 108 may include a plurality of media element storage slots 116 for receiving respective media elements (not shown), where the storage cells or slots 116 of the first storage array 104 oppose or face the storage slots 116 of the second storage array 108. In one arrangement, the various storage slots 116 may be embodied within a plurality of removable storage library modules (e.g., magazines, not shown) of any appropriate form factors that are configured to be positioned within (e.g., inserted into) respective bays (not shown) formed on or in inside surfaces of the first and second storage arrays 104, 108 and removably secured to the first and second storage arrays such as via latches, thumbscrews, and/or the like (e.g., where the various bays may be spaced by any appropriate spacing such as by 1 U, 2 U, or the like).

Each robotic assembly 200 may be generally configured to move in a various manners and dimensions within the interior portion 112 of the storage library 100 to manipulate one or more media elements within the storage library 100. As an example, each robotic assembly 200 may include a robot arm 204 (e.g., hand assembly) housing a media element "picker assembly" (not shown) that is configured (e.g., based on command signals received from the system controller and/or host computer) to grab and release media elements as part of manipulating media elements in storage slots 116 of either of the first or second storage arrays 104, 108 within the storage library 100. For instance, each robotic assembly 200 may be configured to remove media elements from storage slots 116 of either of the first or second storage arrays 104, 108 and insert the same into media element players 120 (e.g., tape drives) for reading and/or writing of data, remove media elements from the media element players 120 and insert the same into the slots 116 of either of the first and second storage arrays 104, 108, read labels on the media elements or media players 120, deliver or retrieve media elements from a media element import/export opening of the storage library 100, and/or the like. The various media element players 120 may be housed within media player cabinets 124 positioned adjacent the first or second storage arrays 104, 108 for access by the robotic assemblies 200 and/or elsewhere within the storage library 100.

The storage library 100 may include a removable power/controller module (not shown) that includes, inter alia, a power supply for supplying the power required by the robotic assemblies 200 to manipulate the media elements and control electronics for generating electrical control signals to control the operation of the robotic assemblies 200. For instance, the power/controller module may be plugged into and removed from a respective bay or slot of the storage library 100. Furthermore, the power/controller module may include or be associated with any appropriate computer program products, i.e., one or more modules of computer program instructions encoded on a non-transitory computer-readable medium for execution by a data processing apparatus to control the operation of the robotic assemblies 200 and other components of the storage library 100. In this regard, the power/controller module may encompass one or more apparatuses, devices, and machines for processing data, including by way of example a programmable processor, a computer, or multiple processors or computers.

With reference to FIGS. 1-2, at least one robotic assembly 200 is mounted over (but not necessarily to) each of the first and second storage arrays 104, 108 for moving (e.g., translating, sliding, etc.) along an x-axis 300 that horizontally extends along a length of the first and second storage arrays 104, 108. For instance, first and third robotic assemblies $200_1$, $200_3$ may be mounted for x-axis translation over the first storage array 104 and second and fourth robotic assemblies $200_2$, $200_4$ may be mounted for x-axis translation over the second storage array 108. However, more or fewer than two robotic assemblies 200 may be mounted over each of the first and second storage arrays 104, 108. In any case, and as will be discussed in more detail herein, each robotic assembly 200 may be configured to access or manipulate media elements of both of the first and second storage arrays 104, 108 as well as translate along the x-axis 300 past another one of the robotic assemblies 200, even when robot arms 204 of the robotic assemblies 200 are disposed at the same height along a z-axis 308 that vertically extends along a height of the first and second storage arrays 104, 108.

With reference now to FIGS. 1-4, each robotic assembly 200 may include at least one x-axis guiding apparatus that is configured to engage with a corresponding x-axis guiding apparatus of the storage library 100 to facilitate translation (e.g., sliding, movement, displacement) of the robotic assembly 200 along the x-axis 300 (or along a course that is parallel to the x-axis 300). As an example, each robotic assembly 200 may include a first (e.g., upper) guiding apparatus 208 and an opposite second (e.g., lower) guiding apparatus 212 that are configured to respectively engage with corresponding first and second opposite x-axis guiding apparatuses 128, 132 near or adjacent upper and lower portions of the first or second storage array 104, 108. For instance, first and second x-axis guiding apparatuses 128, 132 may be in the form of a rail assembly including tracks, grooves, rails, etc. and the first and second guiding apparatuses 208, 212 may include rollers (e.g., wheels) or the like that are respectively configured to be received in and translate along the rail assembly to move the robotic assembly 200 along or parallel to the x-axis 300. However, the x-axis guiding apparatuses may take numerous other forms, all of which are encompassed herein.

Each robotic assembly 200 may also include a z-axis guiding apparatus 216 that is configured to facilitate translation (e.g., sliding, movement, displacement) of the robot arm 204 along or parallel to the z-axis 308. As just one example, the z-axis guiding apparatus 216 may include a rail assembly 220 extending along or parallel to the z-axis 308 and interconnected between the first and second x-axis guiding apparatuses 208, 212, and a z-axis translation member 224 appropriately interconnected to the robot arm 204 that is configured to translate (e.g., slide, move, etc.) along the rail assembly 220. For instance, the z-axis translation member 224 may include a plurality of bearing members (e.g., rollers, wheels, balls) that are configured to roll or ride along the rail assembly 220 to move the robot arm 204 along or parallel to the z-axis 308. While one arrangement for facilitating movement of the robot arm 204 along or parallel to the z-axis 308 is illustrated, it is to be understood that various other arrangements for and manners of moving the robot arm 204 along or parallel to the z-axis 308 are envisioned and encompassed herein.

As discussed previously, the robot arms of two or more existing robotic assemblies mounted on the same rail assembly over a common storage array are sometimes configured to manipulate media elements of either of first or second spaced storage arrays (e.g., such as first and second storage arrays 104, 108), such as by pivoting or rotating through 180 degrees (e.g., about a pivot axis that extends along or is otherwise parallel to the z-axis 308) or the like to access the first or second storage arrays as appropriate. However, contention between the two or more robotic assemblies often arises when one of the robotic assemblies needs to move to a location (e.g., along x-axis 300) that is past another one of the robotic assemblies resulting in media element access delays and other inefficiencies within the storage library. Even if first and second of such robotic assemblies were respectively mounted over the first and second storage arrays on different respective rail assemblies, contention would still result because the pivot axes of the robot arms are typically disposed halfway between the first and second storage arrays (e.g., halfway along y-axis 304) to allow the robot arms to access either of the first or second storage arrays by pivoting through 180°.

Figure 10:
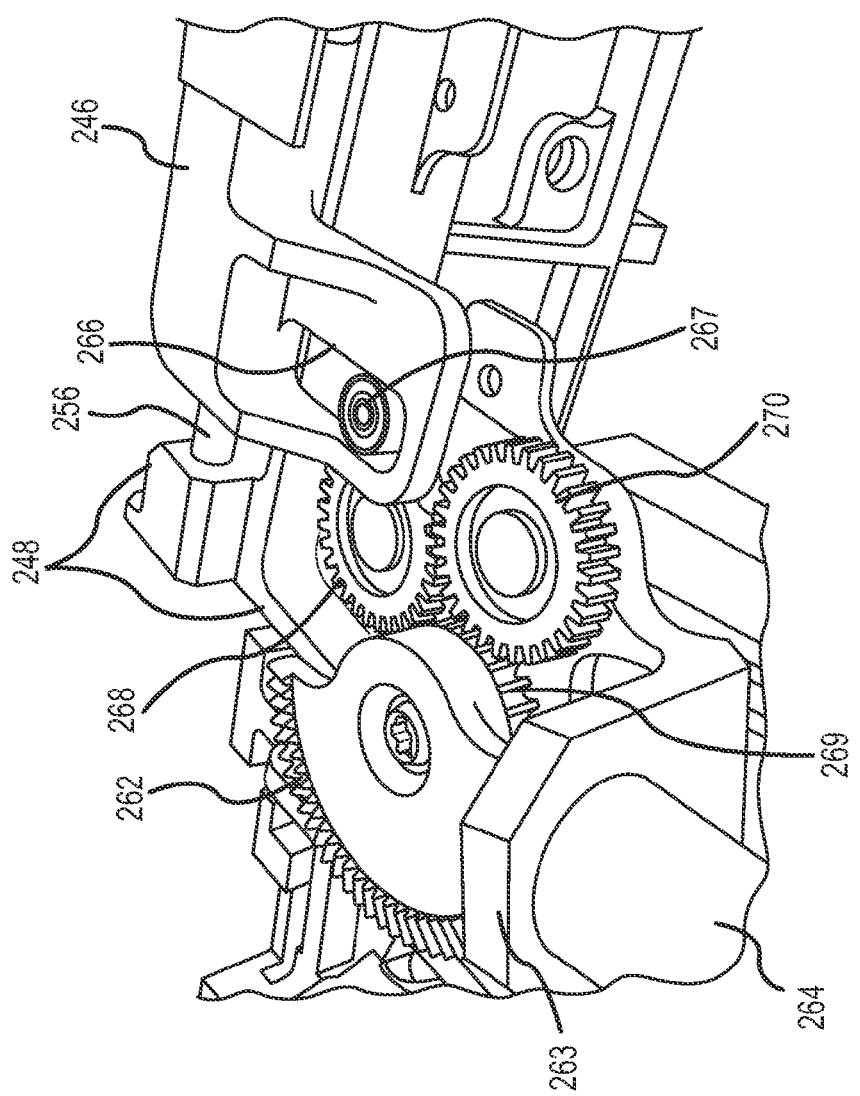
FIG. 10 is a close-up perspective view of a portion of FIG. 9.
Figure 11:
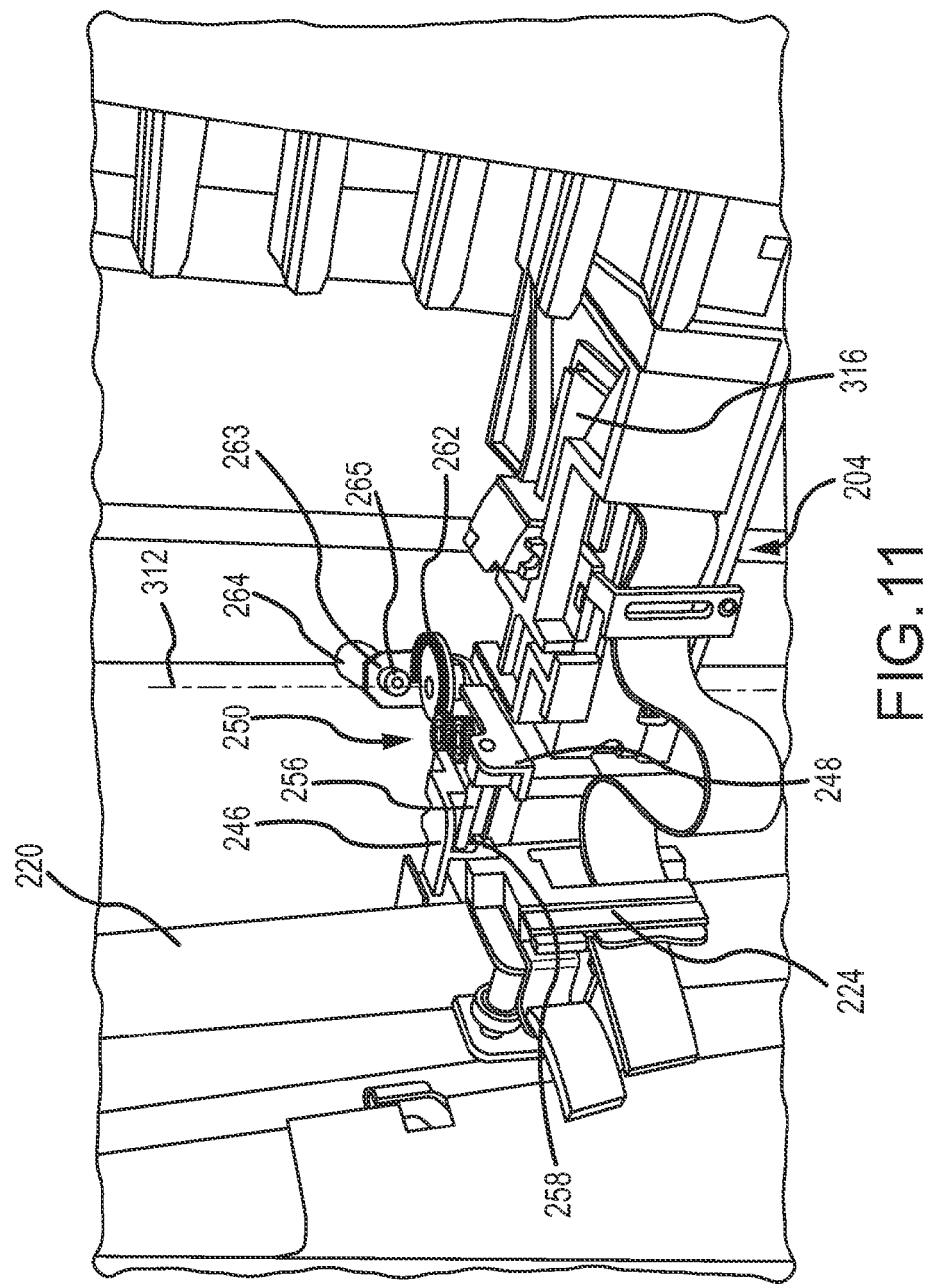
FIG. 11 is a perspective view similar to FIG. 9, but from an opposite perspective.

As will be discussed in more detail in the discussion that follows, the robot arm 204 of each robotic assembly 200 is pivotable about a pivot axis 312 that translates (e.g., moves, displaces) along a translation axis 316 (e.g., parallel to the y-axis 304) away from a central reference plane 320 that is halfway between the first and second storage arrays 104, 108 and parallel to the x and z-axes 300, 308 in response to and simultaneously with the robot arm 204 being pivoted about the pivot axis 316 into a first position adjacent the storage array over which the robotic assembly 200 is mounted (e.g., the first storage array 104 for robotic assemblies $200_1$, $200_3$; the second storage array 108 for robotic assemblies $200_2$, $200_4$) to create a space 136 within the interior space 116 of the storage library through which another robotic assembly 200 mounted over the opposing storage array can pass, even when the robot arms 204 of the two robotic assemblies are disposed at the same height (e.g., along the z-axis 308) within the storage library 100. For instance, see space 136 created by robot arm 204 of first robotic assembly $200_1$ in FIGS. 2 and 12 after pivoting about its pivot axis 312 into its first position adjacent first storage array 104 from its second position adjacent second storage array 108 in FIG. 10.

Figure 12:
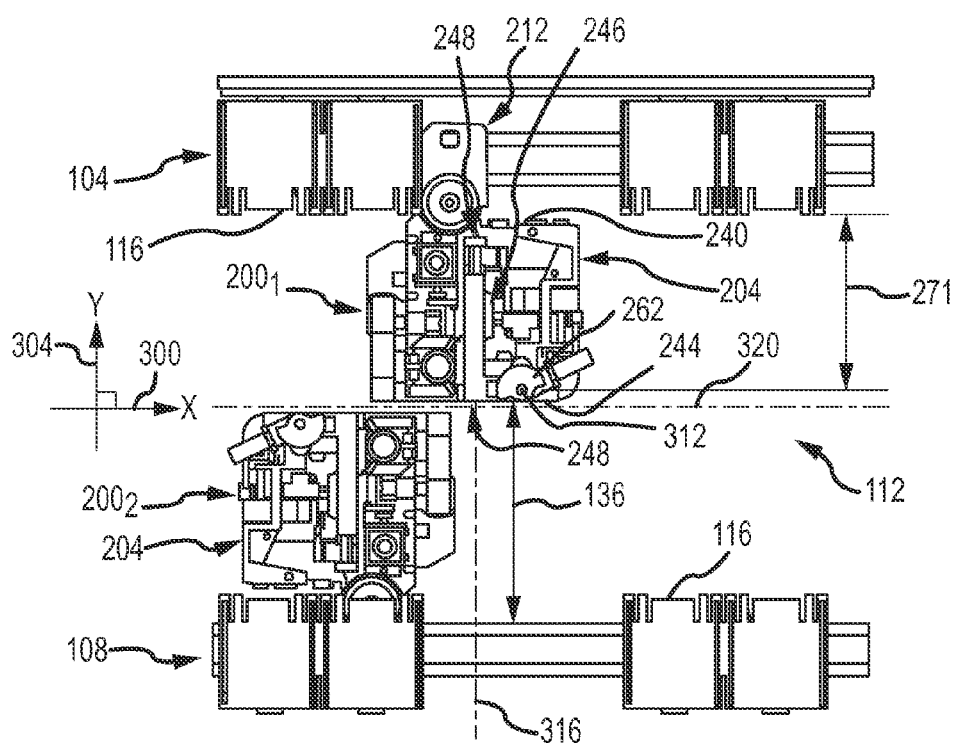
FIG. 12 is a plan view of first and second robotic assemblies mounted over the first and second storage arrays of the storage library of FIG. 1, where the robot arms of the first and second robotic assemblies are in respective first rotational and translational positions adjacent the first and second storage arrays to allow the first and second robot arms to pass each other along an x-axis of the storage library.
Figure 13:
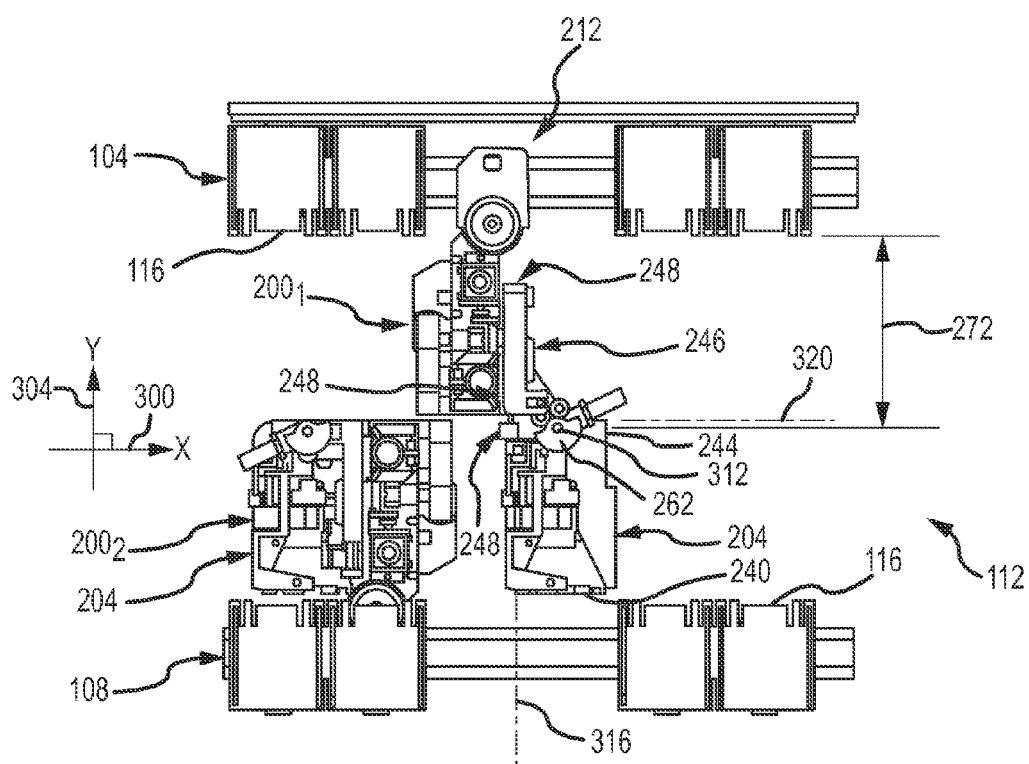
FIG. 13 is a plan view similar to FIG. 12, but with the robot arm of the first robotic assembly reaching across the aisle of the storage library into a second rotational and translational position that is adjacent the second storage array.

Reference is now made to FIGS. 5-11 which present various perspective views of a robot arm 204 of the first robotic assembly $200_1$ in various different rotational and translational positions and FIGS. 12-13 which present plan views of the robot arms 204 of the first and second robotic assemblies $200_1$, $200_2$, where the robot arms 204 of the first and second robotic assemblies $200_1$, $200_2$ are in respective first rotational and translational positions adjacent the first and second storage arrays 104, 108 in FIG. 12 and the robot arm 204 of the first robotic assembly $200_1$ has been pivoted about its pivot axis 312 to reach across the interior space 112 of the storage library 100 into a second rotational and translational position that is adjacent the second storage array 108 in FIG. 13. It is to be understood that this discussion is applicable to additional robotic assemblies used with the storage library (e.g., third and fourth robotic assemblies $200_3$, $200_4$, etc.).

Broadly, each robot arm 204 may generally include a housing 228 (e.g., constructed of plastics, composites, etc.) that is configured to house or otherwise contain any appropriate electronics and other components for use in completing jobs within the storage library 100 such as a picker assembly (not shown) that is configured to telescope within and/or out of the housing 228 to grab media elements 232 (e.g., see FIGS. 3-4), a scanning device 236 (e.g., see FIG. 5) that is configured to read information on the media elements and media players, and the like. Furthermore, the housing 228 of each robot arm 204 includes a first free end 240 through which the picker assembly is configured to emerge for manipulating media elements and an opposite second free end 244.

The robot arm 204 is pivotally and translatably attached to the z-axis guiding apparatus 216 through a mounting member 246, a carriage member 248 slidably attached to the mounting member 248 for movement relative to the mounting member 248 along the translation axis 316, at least one pivot member 242 (e.g., pivot pin, rod, shaft, etc., see FIG. 6) rigidly attached to the robot arm 204 (e.g., such that rotation of the robot arm 204 induces corresponding rotation of the pivot member 242) that pivotally attaches the robot arm 204 to the carriage member 248 for rotation about the pivot axis 312, and a cam assembly 250 that induces translation of the carriage member 248 (and thus the pivot axis 312) along or parallel to the translation axis 316 as the robot arm 204 is pivoted about pivot axis 312 (e.g., via a motor under command of a system controller). In this regard, the robot arm 204 may be configured to pivot about pivot axis 312 and simultaneously translate along translation axis 316 as the z-axis guiding apparatus 216 moves the robot arm 204 along the z-axis 308.

For instance, the mounting member 246 may be in the form of a rigid member (e.g., rigid bracket) that is rigidly or otherwise non-movably secured to the z-axis translation member 224, such as through fasteners 252 being inserted through aligned apertures 254 in the mounting member 246 and the z-axis translation member 224. The carriage member 248 may also be in the form of any appropriate rigid member or bracket that is slidably attached to the mounting member 246 so as to slide or translate along the translation axis 316 (e.g., along or parallel to the y-axis 304). As just one example, the carriage member 248 may include an elongated rod 256 (e.g., tube, post, etc.) extending along or parallel to the translation axis 316 that is configured to be slidably received in a correspondingly shaped elongated aperture 258 of the mounting member 246.

The robot arm 204 may be pivotally attached to the carriage member 248 for rotation about pivot axis 312 in any appropriate manner. As one example, the second free end 244 of the housing 228 of the robot arm 204 may be received between upper and lower portions 260, 261 (e.g., brackets, tabs, etc.) of the carriage member 248 and pivotally secured thereto such as via the pivot member 242 pivotally attaching an upper portion of the housing 228 to the upper portion 260 of the carriage member 248 and another pivot member 243 pivotally attaching a lower portion of the housing 228 to the lower portion 261 of the carriage member 248 (e.g., see FIG. 8). In another arrangement, a single pivot member may extend through the housing 228 of the robot arm 204 and into the upper and lower portions 260, 261 of the carriage member 248. Various other manners of pivotally attaching the robot arm 204 to the carriage member 248 about pivot axis 312 are envisioned and encompassed herein.

The robot arm 204 may be driven to pivot about the pivot axis 312 in any appropriate manner. As just one example, any appropriate gear 262 (e.g., bevel gear) may be rigidly (non-movably) secured to or relative to the pivot member of the robot arm 204 that is adapted to be driven by a corresponding gear 265 (e.g., bevel gear) attached to a shaft of a motor 264 that is driven under control of the system controller. See FIGS. 6, 7, 10 and 11. For instance, the motor shaft and gear 265 may be received through an aperture in a portion 263 (e.g., tab, bracket, wall) of the carriage member 248 so that the motor 264 translates with the carriage member 248 along or parallel to the translation axis 316. Of course, other manners of inducing rotation of the robot arm 204 about pivot axis 312 are also envisioned and encompassed herein.

As mentioned herein, the robotic assembly 200 also includes a cam assembly 250 that induces translation of the carriage member 248 (and thus the pivot axis 312) along or parallel to the translation axis 316 as the robot arm 204 is pivoted about pivot axis 312. See FIGS. 5 and 7-10. In one arrangement, the cam assembly 250 may incorporate aspects of a Scotch yoke or slotted link mechanism that converts the rotational motion of the robot arm 204 about pivot axis 312 into linear translation of the carriage member 248 (and thus pivot axis 312 and second free end 244 of housing 228) along or parallel to translation axis 316. As an example, the mounting member 246 may include an elongated aperture such as a slot 266 generally extending along an axis (not labeled) that is perpendicular to the translation axis 316 within which a sliding member 267 of a rotating component 268 that is rotatably attached to the carriage member 248 (e.g., to upper portion 260) is configured to reciprocate or otherwise slide.

For instance, the rotating component 268 may be in the form of a gear (e.g., spur gear) that is configured to rotate about a rotation axis (not labeled) that is parallel to the pivot axis 312, where the sliding member 267 (e.g., pin, wheel, etc.) is eccentrically attached to the gear (e.g., to an outer perimeter of the gear). As the mounting member 246 is configured to be rigidly (non-movably) attached to the z-axis guiding apparatus 216 (e.g., rigidly attached to the z-axis translation member 224, rotation of the rotating component 268 about its rotation axis in one of a clockwise or counterclockwise direction (e.g., as shown, in the counterclockwise direction) urges the sliding member 267 to slide along the slot 266 along a first course which simultaneously drives the carriage member 248 along the translation axis 316 in a direction towards the storage array over which the robotic assembly 200 is mounted (e.g., the first storage array 104 in the case of the first robotic assembly $200_1$ and the second storage array 108 in the case of the second robotic assembly $200_2$). In contrast, rotation of the rotating component 268 about its rotation axis in the other of the clockwise or counterclockwise direction (e.g., as shown, in the clockwise direction) urges the sliding member 267 to slide along the slot 266 along a second course opposite the first course which simultaneously drives the carriage member 248 along the translation axis 316 in a direction away from the storage array over which the robotic assembly 200 is mounted (e.g., the second storage array 108 in the case of the first robotic assembly $200_1$ and the first storage array 104 in the case of the second robotic assembly $200_2$).

The cam assembly 250 also includes a system for inducing rotation of the rotating component 268 about its rotation axis in one of the clockwise or counterclockwise directions simultaneous with rotation of the robot arm 204 about its pivot axis 312 in the one of the clockwise or counterclockwise directions. In one arrangement, the pivot member 242 may include a gear 269 (e.g., spur gear) rigidly (non-movably) secured to or relative to the pivot member 242 of the robot arm 204 that is configured to rotate about the pivot axis 312 as the pivot member 242 rotates about the pivot axis 312. To induce rotation of the rotating component 268 in the same rotational direction as the gear 269 (and thus the robot arm 204), the cam assembly 250 may include an intermediate gear 270 (e.g., spur gear) that is configured to simultaneously mesh with the teeth of the gear 269 and the rotating component 268. In this regard, rotation of the gear 269 in a counterclockwise direction (e.g., by driving of gear 262 in the counterclockwise direction by gear 265 of motor 264) induces simultaneous rotation of the intermediate gear 270 in a clockwise direction which, in turn, induces simultaneous rotation of the rotating component 268 in the counterclockwise direction (and vice versa). While one arrangement of gears has been shown to induce rotation of the rotating component 268 during rotation of the robot arm 204, it is to be understand that various other arrangements and type of gears and/or other components could be appropriately incorporated into the cam assembly 250 to rotate the rotating component 268 during rotation of the robot arm 204 which are hereby incorporated in the present disclosure.

To facilitate the reader's understanding of how the disclosed utilities reduce contention between robotic assemblies within a storage library, reference is now initially made to FIGS. 1-2, 5 and 12. As shown, the robot arm 204 of each of the first, second, third and fourth robotic assemblies $200_1$, $200_2$, $200_3$, $200_4$ is disposed in its first rotational position about pivot axis 312 and in its first translational position along or relative to translation axis 316. In the case of the first and third robotic assemblies $200_1$, $200_3$, the carriage member 248 is positioned at a first translational position along the translation axis 316 relative to the mounting member 246 and first storage array 104 thus spacing the pivot axis 312 a first distance 271 from the first storage array 104 (as the pivot axis 312 is fixed relative to the carriage member 248). Furthermore, the first free end 240 of the robot arm 204 is adjacent the first storage array 104 on one side of the pivot axis 312 for manipulation of media elements thereof (e.g., by picker assembly) or the like while the second free end 244 of the robot arm 204 is spaced from the first storage array 104 on an opposite side of the pivot axis 312 but between the central reference plane 320 and the first storage array 104.

In the case of the second and fourth robotic assemblies $200_2$, $200_4$, the carriage member 248 is positioned at a first translational position along the translation axis 316 relative to the mounting member 246 and second storage array 108 thus spacing the pivot axis 312 a first distance (not labeled) from the second storage array 108 (as the pivot axis 312 is fixed relative to the carriage member 248). Furthermore, the first free end 240 of the robot arm 204 is adjacent the second storage array 108 on one side of the pivot axis 312 for manipulation of media elements thereof (e.g., by picker assembly) or the like while the second free end 244 of the robot arm 204 is spaced from the second storage array 108 on an opposite side of the pivot axis 312 but between the central reference plane 320 and the second storage array 108.

In this regard, spaces 136 are created or otherwise exist between the central axis 320 and the second storage array 108 through which the second and fourth robotic assemblies $200_2$, $200_4$ (or other such robotic assemblies 200 mounted over the second storage array 108) can translate along or parallel to the x or z-axes 300, 308 (when the second and fourth robotic assemblies $200_2$, $200_4$ are in their first rotational and translational positions) and between the central axis 320 and the first storage array 104 through which the first and third robotic assemblies $200_1$, $200_3$ (or other such robotic assemblies 200 mounted over the first storage array 104) can translate along or parallel to the x or z-axes 300, 308 (when the first and third robotic assemblies $200_1$, $200_3$ are in their first rotational and translational positions) for completing jobs within the storage library 100. For instance, see robot arm 204 of second robotic assembly $200_2$ passing through space 136 in FIG. 12 free of contact with the robot arm 204 of the first robotic assembly $200_1$.

Assume now that the system controller of the storage library 100 has received a request from a host computer for data located on a particular media element disposed within a slot 116 of the second storage array 108 and that the system controller has determined that the first robotic assembly $200_1$ is going to fulfill the request (e.g., by grabbing the media element and inserting the same into a media player 120 of the storage library 100). For instance, the system controller may, if necessary, instruct the first robotic assembly $200_1$ to translate or otherwise move along or parallel to the x-axis 300 to an x-axis coordinate that aligns with the particular media element in the second storage array 108. The system controller may also, if necessary, instruct the first robotic assembly $200_1$ to translate or otherwise move its robot arm 204 along or parallel to the z-axis 308 to a z-axis coordinate that aligns with the particular media element in the second storage array 108. Part of the aforementioned process may include determining whether any other robotic assemblies 200 are disposed in the path of the first robotic assembly $200_1$ and/or its robot arm 204 and commanding such robotic assemblies 200 to move to different locations in the storage library and/or waiting to move the first robotic assembly $200_1$ and/or its robot arm 204.

Figure 5:
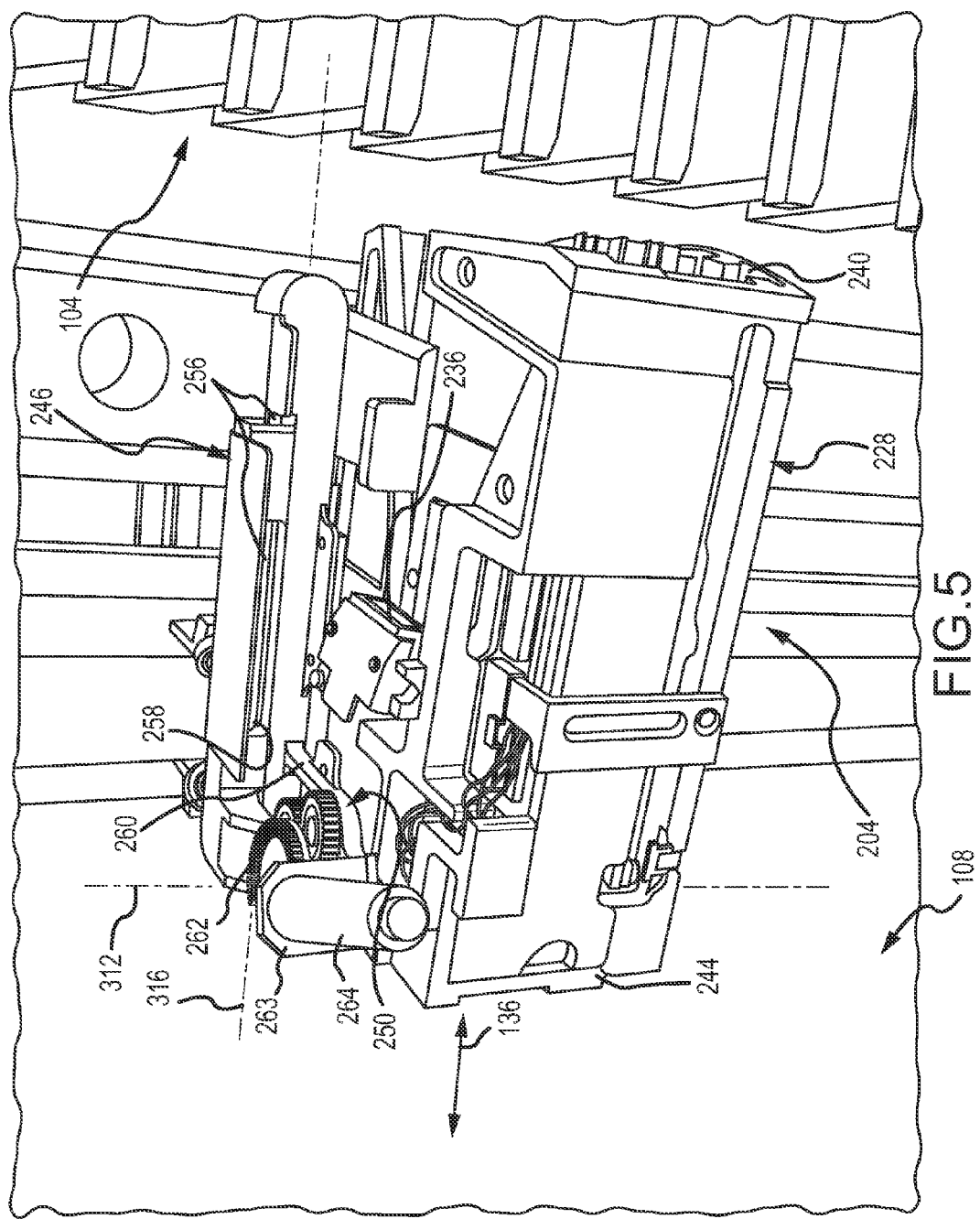
FIG. 5 is a perspective view of a portion of the robotic assembly of FIG. 3, with the robot arm being in a first rotational and translational position adjacent a first storage array of the storage library.
Figure 6:
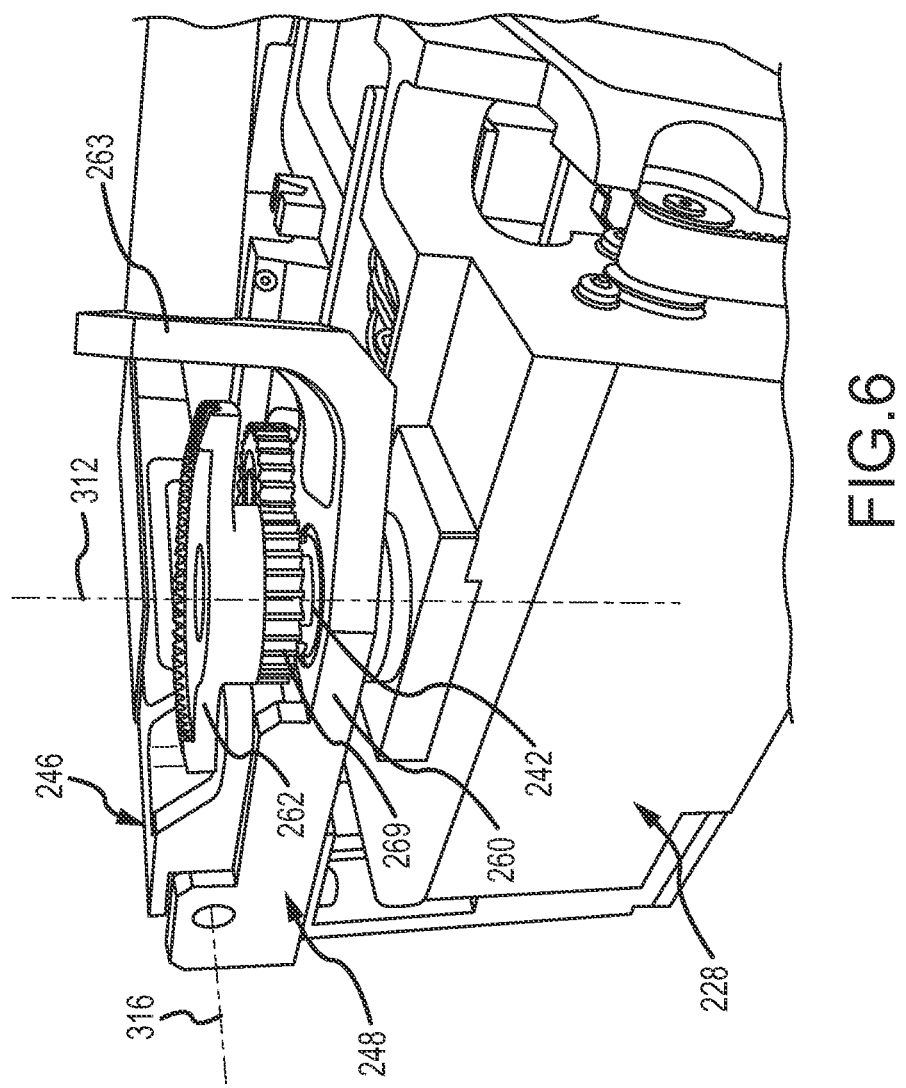
FIG. 6 is a close-up perspective view of a portion of FIG. 5.
Figure 7:
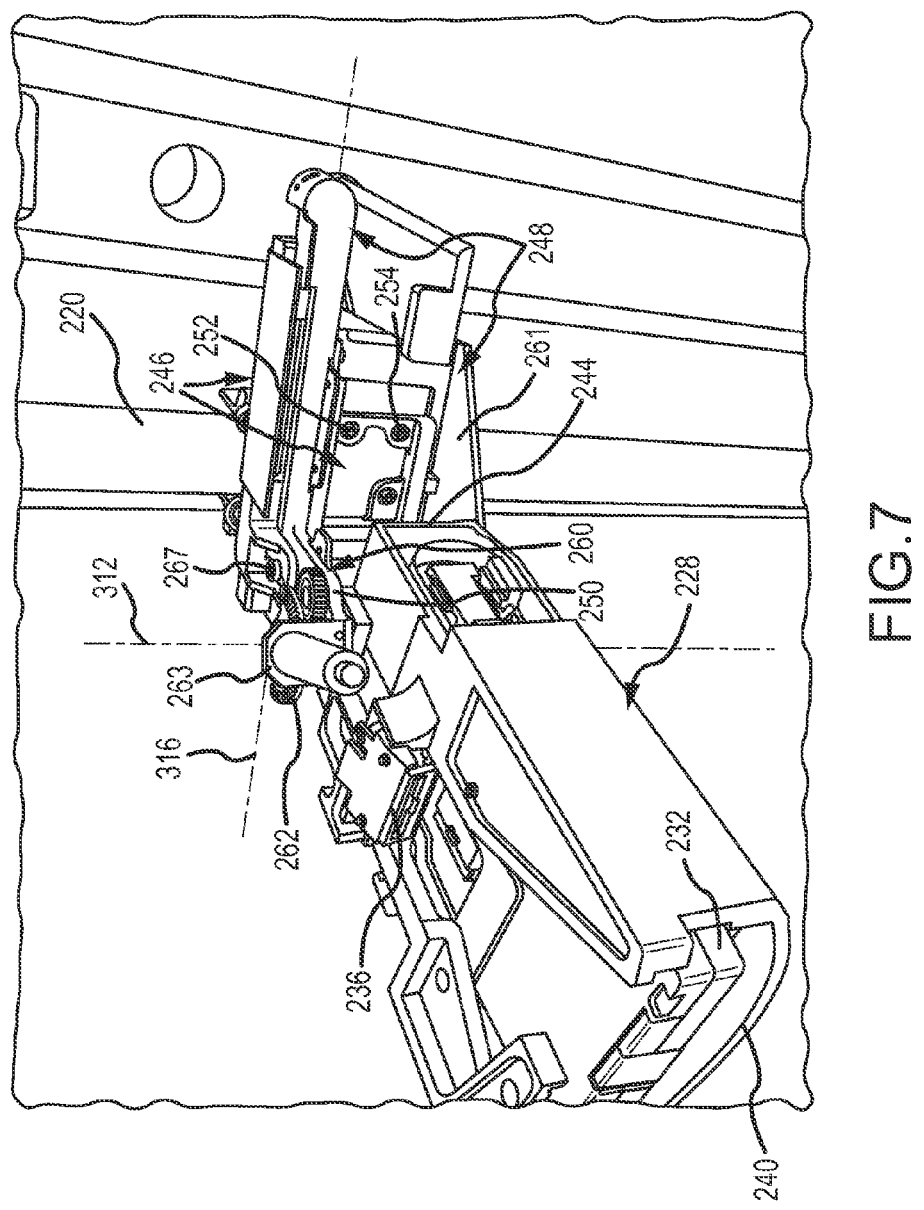
FIG. 7 is a perspective view similar to FIG. 5, but with the robot arm being in another rotational and translation position that is between the first and second storage arrays of the storage library.
Figure 8:
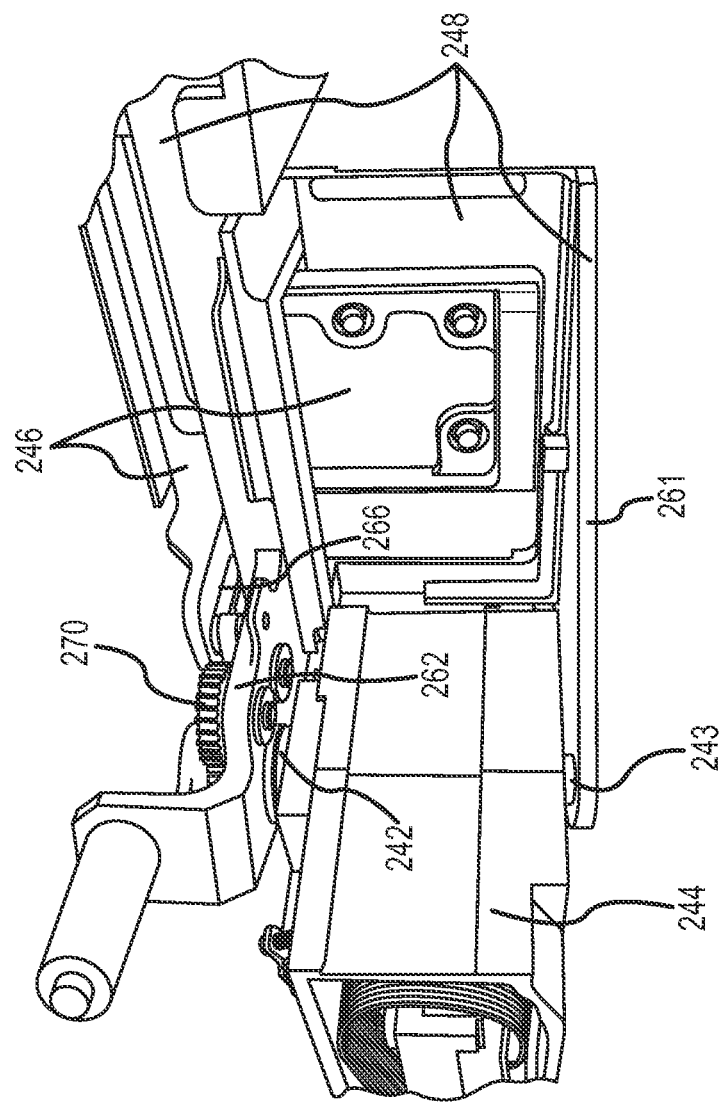
FIG. 8 is a close-up perspective view of a portion of FIG. 7.
Figure 9:
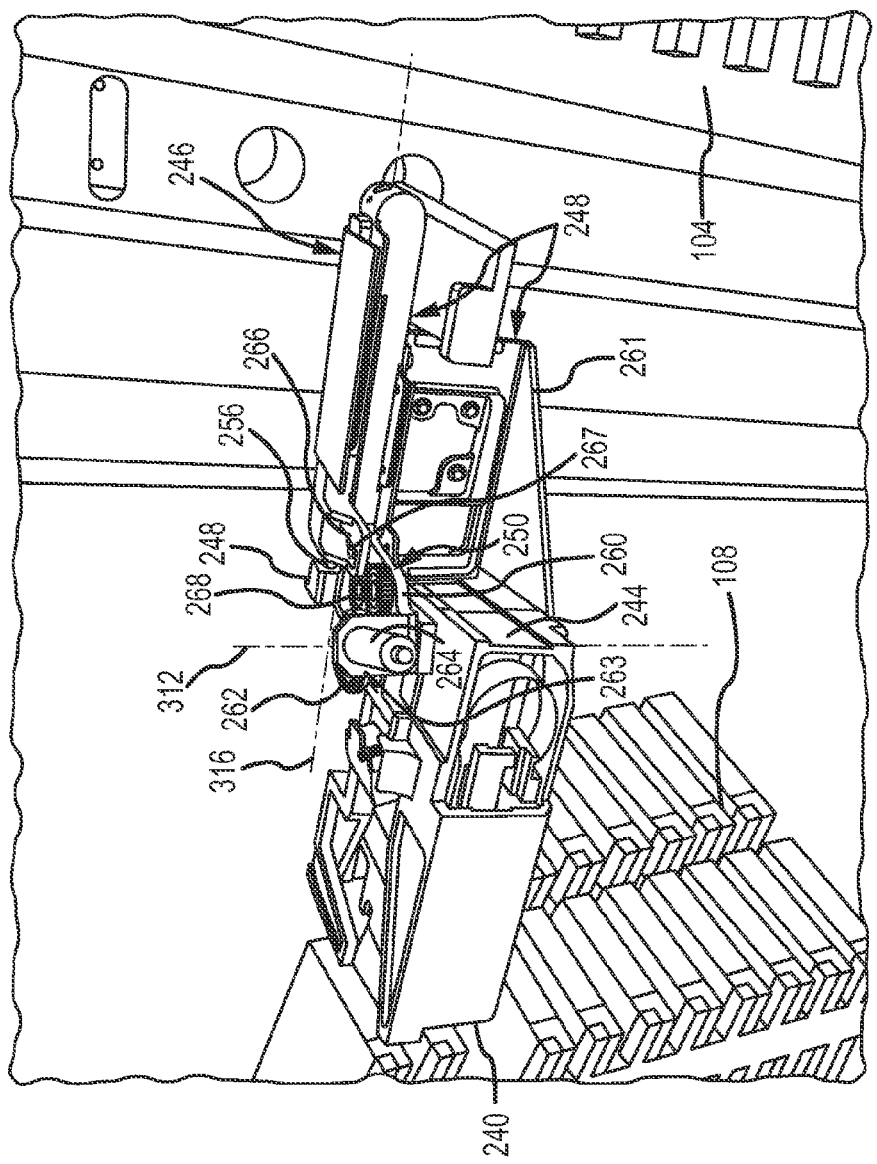
FIG. 9 is a perspective view similar to FIG. 7, but with the robot arm being in another rotational and translation position adjacent the second storage array of the storage library.
Figure 14:
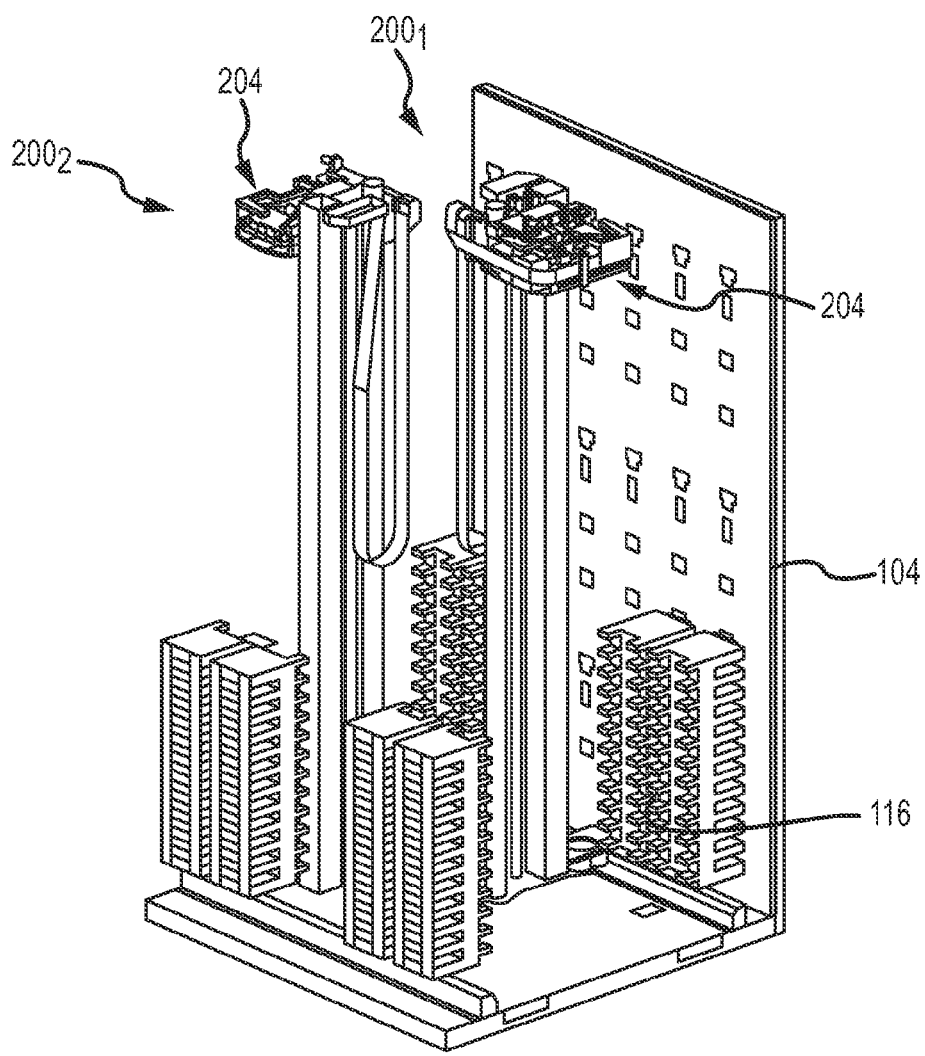
FIG. 14 is a perspective view similar to the plan view of FIG. 12.
Figure 15:
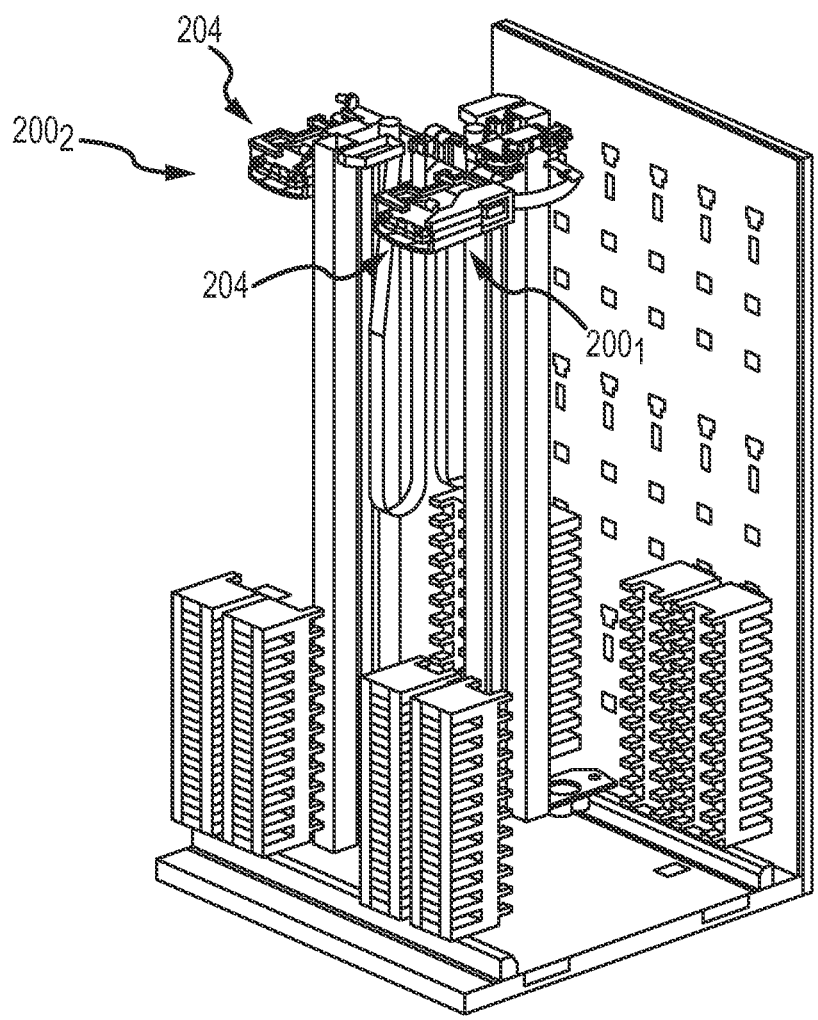
FIG. 15 is a perspective view similar to the plan view of FIG. 13.

In any case, the system controller may then command the first robotic assembly $200_1$ to pivot its robot arm 204 about its pivot axis 312 in one of a clockwise or counterclockwise direction into a second rotational position which, as discussed herein, also simultaneously translates the robot arm 204 into a second translational position along or parallel to the translation axis 316 that is spaced from the first translational position away from the first storage array 104. Compare FIGS. 3-4; FIGS. 5, 7 and 9; FIGS. 12-13; and FIGS. 14-15. For instance, the system controller may power the motor 264 (see FIG. 8) to rotate bevel gear 265 to induce simultaneous rotation of gear 262, pivot member 242, robot arm 204, gear 269, intermediate gear 270, and rotating component 268 as discussed above. As also discussed previously, rotation of rotating component 268 about its rotation axis in the one of the clockwise or counterclockwise direction urges the sliding member 267 to slide along the slot 266 which simultaneously drives the carriage member 248 along the translation axis 316 in a direction away from the first storage array 104 into the second translational position. As the robot arm 204 is pivotally attached to the carriage member 248 at a fixed location on the carriage member 248 (via pivot member 242), driving of the carriage member 248 also simultaneously drives the pivot axis 312 and the robot arm 204 along or parallel to the translation axis 316 into the second translational position as the robot arm 204 is being pivoted about pivot axis 312 into its second rotational position.

With reference to FIGS. 9-11 and 13, the carriage member 248 of the first robotic assembly $200_1$ is positioned at a second translational position along the translation axis 316 relative to the mounting member 246 and first storage array 104 thus spacing the pivot axis 312 a second distance 272 from the first storage array 104 that is greater than the first distance 271. Furthermore, the first free end 240 of the robot arm 204 of the first robotic assembly $200_1$ is now adjacent the second storage array 108 on one side of the pivot axis 312 for manipulation of media elements thereof (e.g., by picker assembly) while the second free end 244 is spaced from the second storage array 108 on an opposite side of the pivot axis 312 but between the central reference plane 320 and the second storage array 108. In other words, the pivot axis 312 has translated or displaced from one side of the central reference plane 320 to the opposite side of the central reference plane 320 thus allowing the robot arm 204 to "reach across" the interior space 112 to the second storage array 108 (e.g., where the distance between the pivot axis 312 and the central reference plane 320 in FIG. 12 is approximately equal to the distance between the pivot axis 312 and the central reference plane 320 in FIG. 13). Compare FIGS. 12-13.

More specifically, had the pivot axis 312 been fixed relative to the mounting member 246 and thus the first and second storage arrays 104, 108 in FIG. 12 (where the pivot axis is disposed between the central reference plane 320 and the first storage array 104), rotation of the robot arm 204 about the pivot axis 312 would have resulted in the first free end 240 of the robot arm 204 being spaced farther from the second storage array 108 in the second rotational position than the first free end 240 is spaced from the first storage array 104 in the first rotational position of FIG. 13 resulting in complications with the picker assembly manipulating media elements among other inefficiencies.

In this regard, the disclosed utilities effectively move robot arms 204 of robotic assemblies 100 mounted over one of the first and second storage arrays 104, 108 out of the path of robot arms of robotic assemblies mounted over the other of the first and second storage arrays 104, 108 to limit contention between the robotic assemblies and increase throughput of the storage library 100. Another advantage of the disclosed utilities is the ability to simultaneously pivot and translate the robot arms 204 of the robotic assemblies 200 in the manners disclosed herein through use of a single actuator or servo (e.g., the motor 264 of FIG. 11) rather than through use of two or more actuators (e.g., one to rotate or control rotation of the robot arm 204 and another to translate or control translation of the robot arm 204).

It will be readily appreciated that many additions and/or deviations may be made from the specific embodiments disclosed in the specification without departing from the spirit and scope of the invention. In one arrangement, for example, the cam assembly 250 may include a worm gear driven by a motor that is configured to mesh with and drive the rotating component 268 (e.g., where the rotating component is in the form of a helical gear). In this regard, operation of the motor to drive the worm gear and rotate the rotating component 268 drives the carriage member 248 towards or away from the mounting member 246 and simultaneously rotates the robot arm 204 about the pivot axis 312. In this arrangement, the gear 262 and motor 264 would not be necessary. Furthermore, an intermediate gear may be intermeshed with the rotating component 268 and the pivot member 242 in any appropriate manner. As another example, the first and second x-axis guiding apparatuses of the first and second storage arrays 104, 108 could in some arrangements be mounted in or on a ceiling and/or floor (not labeled) of the storage library 100. Still further, the utilities disclosed herein may be applied to robot arms other than those specifically shown herein.

The illustrations and discussion herein has only been provided to assist the reader in understanding the various aspects of the present disclosure. Furthermore, one or more various combinations of the above discussed arrangements and embodiments are also envisioned. While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A robotic assembly for manipulating media elements in a media element storage library, comprising:
   a mounting apparatus;
   a carriage member slidably attached to the mounting apparatus for movement relative to the mounting apparatus along a translation axis;
   a robot arm pivotally attached to the carriage member for rotation about a pivot axis fixed through the carriage member between at least a first rotational position for manipulating media elements of a first storage array of the storage library and a second rotational position for manipulating media elements of a second storage array of the storage library that is spaced from the first storage array; and
   a cam assembly that induces translation of the carriage member along the translation axis between at least a first translational position in response to rotation of the robot arm about the pivot axis into the first rotational position and a second translational position in response to rotation of the robot arm about the pivot axis into the second rotational position, wherein the cam assembly includes:
   a slot within the mounting apparatus;
   a rotating component rotatably attached to the carriage member for rotation about a rotation axis; and
   a sliding member attached to the rotating component and slidably received in the slot, wherein rotation of the robot arm about the pivot axis induces rotation of the rotating component about the rotation axis to slide the sliding member in the slot and thereby simultaneously translate the carriage member along the translation axis.

2. The robotic assembly of claim 1, further including:
   a pivot member pivotally attached to the carriage member along the pivot axis, wherein the robot arm is non-movably attached to the pivot member, and wherein rotation of the pivot member about the pivot axis induces rotation of the rotating component about the rotation axis to slide the sliding member in the slot and thereby simultaneously translate the carriage member along the translation axis.

3. The robotic assembly of claim 2, wherein the pivot member includes a first gear non-movably attached thereto for rotation about the pivot axis, wherein the rotating component includes a second gear rotatable about the rotation axis, and wherein the cam assembly further includes a third gear intermeshed with the first and second gears that induces rotation of the second gear about the rotation axis in a clockwise or counterclockwise direction when the first gear is rotated about the pivot axis in the clockwise or counterclockwise direction.

4. The robotic assembly of claim 1, wherein the pivot axis is spaced from and parallel to the rotation axis.

5. The robotic assembly of claim 4, wherein the slot extends along a reference axis, wherein the reference axis is perpendicular to the translation axis, and wherein the translation axis is perpendicular to the pivot axis.

6. The robotic assembly of claim 1, wherein the translation axis is perpendicular to the pivot axis.

7. The robotic assembly of claim 1, wherein the robot arm includes:
   a housing; and
   a hand assembly slidably attached to the housing for manipulating media elements of the first and second storage arrays.

8. The robotic assembly of claim 1, further including:
   a first x-axis guiding apparatus configured to slide relative to a corresponding second x-axis guiding apparatus of the storage library along or parallel to an x-axis; and
   a z-axis guiding apparatus interconnected to the x-axis guiding apparatus of the robotic assembly that facilitates movement of the mounting apparatus along or parallel to a z-axis, wherein the z-axis is perpendicular to the x-axis.

9. The robotic assembly of claim 8, wherein the pivot axis is parallel to the z-axis.

10. The robotic assembly of claim 8, wherein the pivot axis is perpendicular to the z-axis.

11. The robotic assembly of claim 8, wherein the translation axis is perpendicular to the x-axis and z-axis.

12. A media element storage library, comprising:
   a first storage array including a first plurality of media element storage slots;
   a second storage array including a second plurality of media element storage slots;
   an aisle separating the first and second storage arrays, wherein the aisle includes a central reference plane extending between the first and second storage arrays;
   a first robotic assembly mounted over the first storage array for manipulating media elements in the media element storage slots of the first and second storage arrays, wherein the first robotic assembly comprises:
      a first mounting apparatus;
      a first carriage member slidably attached to the first mounting apparatus for movement relative to the first mounting apparatus along a first translation axis;
      a first robot arm pivotally attached to the first carriage member for rotation about a first pivot axis fixed through the first carriage member between at least a first rotational position for manipulating media elements of the first storage array and a second rotational position for manipulating media elements of the second storage array; and
      a first cam assembly that induces translation of the first carriage member along the first translation axis between at least a first translational position in response to rotation of the first robot arm about the first pivot axis into the first rotational position and a second translational position in response to rotation of the first robot arm about the first pivot axis into the second rotational position, wherein a substantial entirety of the first robotic assembly is disposed between the central reference plane and the first storage array when the first robot arm is in the first rotational position; and
   a second robotic assembly mounted over the second storage array for manipulating media elements in the media element storage slots of the first and second storage arrays, wherein the second robotic assembly comprises:
      a second mounting apparatus;
      a second carriage member slidably attached to the second mounting apparatus for movement relative to the mounting apparatus along a second translation axis;
      a second robot arm pivotally attached to the second carriage member for rotation about a second pivot axis fixed through the second carriage member between at least a first rotational position for manipulating media elements of the second storage array and a second rotational position for manipulating media elements of the first storage array; and
      a second cam assembly that induces translation of the second carriage member along the second translation axis between at least a first translational position in response to rotation of the second robot arm about the second pivot axis into the first rotational position and a second translational position in response to rotation of the second robot arm about the second pivot axis into the second rotational position, wherein a substantial entirety of the second robotic assembly is disposed between the central reference plane and the second storage array when the second robot arm is in the first rotational position.

13. The media element storage library of claim 12, wherein the first robotic assembly is configured to translate over the first storage array parallel to an x-axis, wherein the first robot arm is configured to move along a z-axis that is perpendicular to the x-axis, wherein the second robotic assembly is configured to translate over the second storage array parallel to the x-axis, and wherein the second robot arm is configured to move parallel to the z-axis.

14. The media element storage library of claim 13, wherein pivoting of the first robot arm about the first pivot axis induces simultaneous translation of the first pivot axis along a first course that is parallel to a y-axis, wherein pivoting of the second robot arm about the second pivot axis induces simultaneous translation of the second pivot axis along a second course that is parallel to the y-axis, and wherein the y-axis is perpendicular to each of the x and z-axes.

15. The media element storage library of claim 13, wherein the first and second pivot axes are parallel to the z-axis or the x-axis.

16. A media element storage library, comprising:
   a first storage array including a first plurality of media element storage slots;
   a second storage array including a second plurality of media element storage slots, wherein the media element storage slots of the second storage array are spaced from and face the media element storage slots of the first storage array;
   a first robotic assembly configured to translate over the first storage array parallel to an x-axis, wherein the first robotic assembly includes a first robot arm that comprises a housing having a first end from which a mechanism is configured to extend for manipulating media elements, wherein the first robot arm is pivotal about a first pivot axis between at least a first rotational position for manipulating media elements in the media element storage slots of the first storage array and a second rotational position for manipulating media elements in the media element storage slots of the second storage array, wherein the first end of the housing of the first robot arm faces the first storage array when the first robot arm is in its first rotational position; and
   a second robotic assembly configured to translate over the second storage array parallel to the x-axis, wherein the second robotic assembly includes a second robot arm that comprises a housing having a first end from which a mechanism is configured to extend for manipulating media elements, wherein the second robot arm is pivotal about a second pivot axis between at least a first rotational position for manipulating media elements in the media element storage slots of the second storage array and a second rotational position for manipulating media elements in the media element storage slots of the first storage array, wherein the first end of the housing of the second robot arm faces the second storage array when the second robot arm is in its first rotational position, and wherein the respective first and second robot arms of the first and second robotic assemblies are simultaneously positionable in their respective first rotational positions at a common height along a z-axis that is perpendicular to the x-axis while at a common position along the x-axis.

17. The media element storage library of claim 16, wherein pivoting of the first robot arm of the first robotic assembly about the first pivot axis induces simultaneous translation of the first pivot axis along a first course that is parallel to a y-axis, wherein pivoting of the second robot arm of the second robotic assembly about the second pivot axis induces simultaneous translation of the second pivot axis along a second course that is parallel to the y-axis, and wherein the y-axis is perpendicular to each of the x and z-axes.

18. The media element storage library of claim 16, wherein the first and second pivot axes are parallel to the z-axis or the x-axis.

* * * * *